United States Patent [19]
Feng

[11] Patent Number: 6,064,448
[45] Date of Patent: May 16, 2000

[54] INDUCED AC POWER SOURCES VIDEO AMPLIFIER

[75] Inventor: Hsiu Mei Feng, Taipei Hsien, Taiwan

[73] Assignee: Long Well Electronics Corp., Taipei Hsien, Taiwan

[21] Appl. No.: 09/076,794

[22] Filed: May 13, 1998

[51] Int. Cl.[7] .................................................. H04N 5/14
[52] U.S. Cl. ................................ 348/707; 348/6; 348/8; 348/10; 348/725; 455/3.1
[58] Field of Search ............................ 348/6, 8, 10, 707, 348/725; 455/3.1, 6.1, 341; 361/119, 56, 113, 18; 333/101, 103, 104, 105

[56] References Cited

U.S. PATENT DOCUMENTS

| | | | |
|---|---|---|---|
| 4,959,873 | 9/1990 | Flynn et al. | 455/303 |
| 5,151,838 | 9/1992 | Dockery | 340/310 |
| 5,243,415 | 9/1993 | Vance | 358/86 |
| 5,341,179 | 8/1994 | Konishi | 348/730 |
| 5,570,003 | 10/1996 | Zimmermann | 323/284 |
| 5,787,335 | 7/1998 | Novak | 455/3.2 |
| 5,844,766 | 12/1998 | Miglioli | 361/119 |

*Primary Examiner*—Andrew I. Faile
*Assistant Examiner*—Habte Bahgi
*Attorney, Agent, or Firm*—Bacon & Thomas

[57] ABSTRACT

An induced AC power source video amplifier includes a signal amplifying circuit, a transformer, and a plastic material shell. One end of the transformer is connected to a metal AC line input prong, and another end is connected to supply power to a signal amplifying circuit. The signal amplifying circuit and transformer are fixed to the plastic material shell so that the metal prong projects to the outside of the shell. The shell further includes input and output terminals and selective switches, including a gain select switch and an input select switch. A single wire line section of proper length is wound around the AC line input between the input prong and the transformer to form a non-contact coil connected to a wireless input end of the input select switch, thus forming a direct inductive connection between the AC line input and the signal amplifying circuit when the input select switch is switched to disconnect the antenna/cable input from the signal amplifying circuitry, the inductive nature of the power line signal connection serving to remove interference from the received TV signal. The gain select switch permits the amplifier to be connected with a CATV cable, an outdoor antenna, or a radio device, while the loop formed by the inductive power line signal connection provides protection from lightning strikes, and reduces the risk of electric shock.

2 Claims, 8 Drawing Sheets

INDUCED AC POWER SOURCES VIDEO AMPLIFIER

BACKGROUND OF THE INVENTION

1. Field of the Invention

The present invention relates to an induced AC power source video amplifier for preventing damage due to lightning strikes and reduce the risk of electric shock, and especially to a video amplifier for use with cable or wireless TV signals.

2. Description of the Prior Art

In a general signal amplifier, a signal amplifying circuit and a transformer are used to provide all kinds of amplifying functions. For the signal amplifier shown in FIG. 1, an output/input box A is used to connect a plug portion B. Three terminal seats are installed on the output/input box for connecting coaxial cables and TVs so that the signal inputted from the coaxial cable will be amplified by the signal amplifying circuit, and then output to an output which provides clearer TV signals.

Referring to FIG. 2, another prior signal amplifier is shown. The signal amplifier includes a box 1, a seat 2, a transformer 3, and a signal amplifying circuit board 4, wherein a signal input terminal and a signal output terminal are installed on the periphery of the box and a signal amplifying circuit board is installed within the box, while the signal amplifying circuit board is connected with the signal input terminal and signal output terminal by wires.

In summary, the signal amplifying circuit of the two prior signal amplifiers connected with a transformer, and then it is further connected with a power source directly. This structure is vulnerable to lightning strikes and presents a risk of an electric shock. Furthermore, the prior signal amplifier is only used to receive the signal of cable TV or wireless TV, and thus the user is often needs to buy two different signal amplifiers.

Therefore, in order to solve the defects of vulnerability to lightning or risk of electric shocks in the prior signal amplifier, the present invention provides an induced AC power source video amplifier. By winding a single wire line section connected to the wireless input end of the input signal switch so to form a non-contact inducing coil to pick up a signal in the AC line, the receiving signal of a TV will become more clear. Moreover, the present invention may be used to receive a signal from a TV cable or from an outdoor antenna and then amplify the signal. It may also be used to connect with a radio device to receive a program, and has the effect of preventing risks of lightning strikes or electric shock.

SUMMARY OF THE INVENTION

Accordingly, the main object to the present invention is to provide an induced AC power source video amplifier, the signal on the AC line is induced by a non-contact coil so that the signal of a TV will become more clear.

A further object of the present invention is to provide an induced AC power source video amplifier for preventing risks of lightning strikes or electric shock.

A still further object of the present invention is to provide an induced AC power source video amplifier which may be used to connect with a radio to receive a video and radio programs simultaneously.

Yet another object of the present invention is to provide an induced AC power source video amplifier which may connect with an original cable TV or outdoor antenna.

Accordingly, the induced AC power source video amplifier of the present invention comprises a signal amplifying circuit, a transformer, and a plastic material shell; wherein one end of the transformer is connected on a metal AC line current power input prong and another end thereof is connected with a signal amplifying circuit, the signal amplifying circuit and transformer being wholly fixedly locked on the plastic insulating shell so that the input prong will project to the outside of the shell. The shell is further installed with an input/output end and an input select switch, and characterized in that a single axis line section connected to the wireless input end of the input select switch and having a proper length is wound around the line connection between the input prong and the transformer, so that a signal from the non-contact coil is induced on the AC line and the receiving signal of TV will become more clear. The resulting amplifier may be connected with the original cable TV or outdoor antenna or connected with a radio device for receiving programs, and has the function of reducing risks of lightning strikes or electric shock.

The present invention will be better understood and its numerous objects and advantages will become apparent to those skilled in the art by referencing to the following drawings in which:

DETAILED DESCRIPTION OF THE PREFERRED EMBODIMENT

Figure 1:
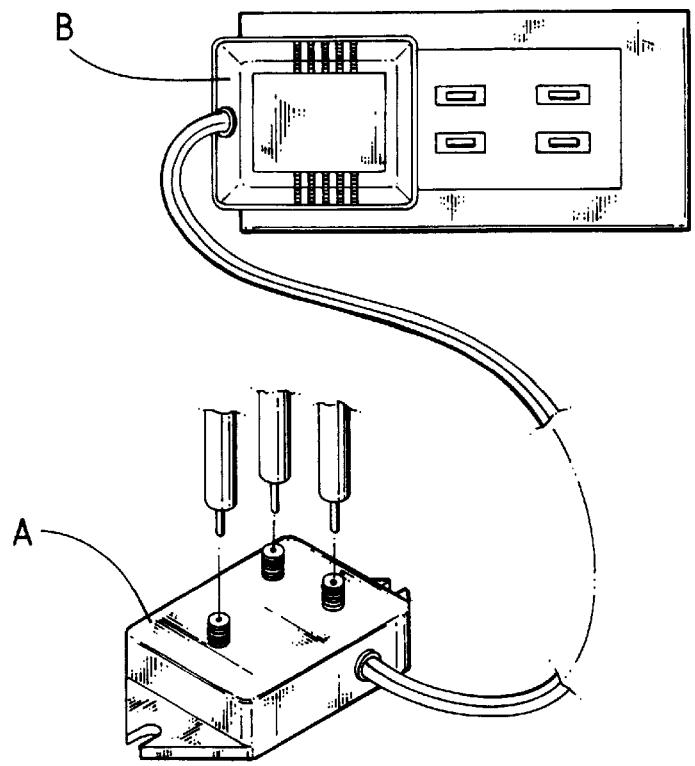
FIG. 1 is a schematic perspective view showing a prior signal amplifier.
Figure 2:
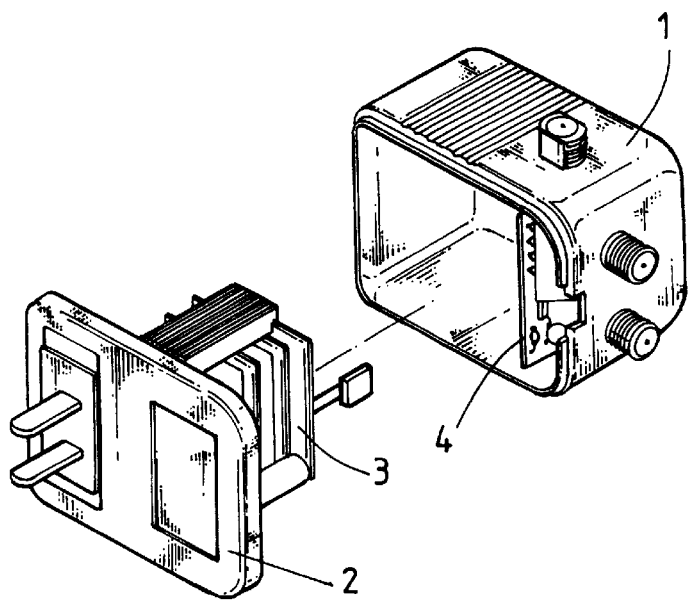
FIG. 2 is an exploded view of the components of another prior signal amplifier.
Figure 3:
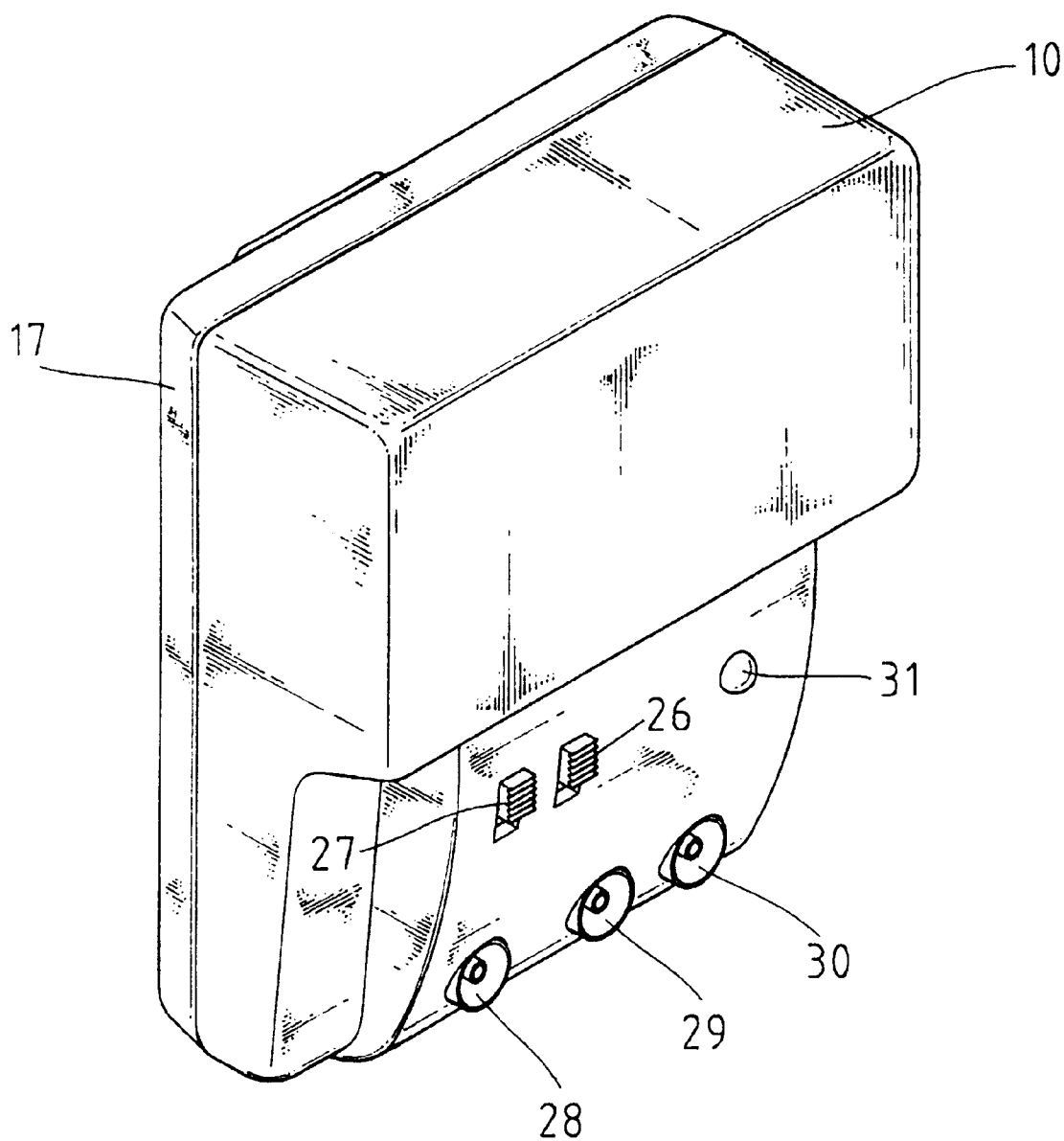
FIG. 3 is a perspective view of the embodiment in the present invention.
Figure 4:
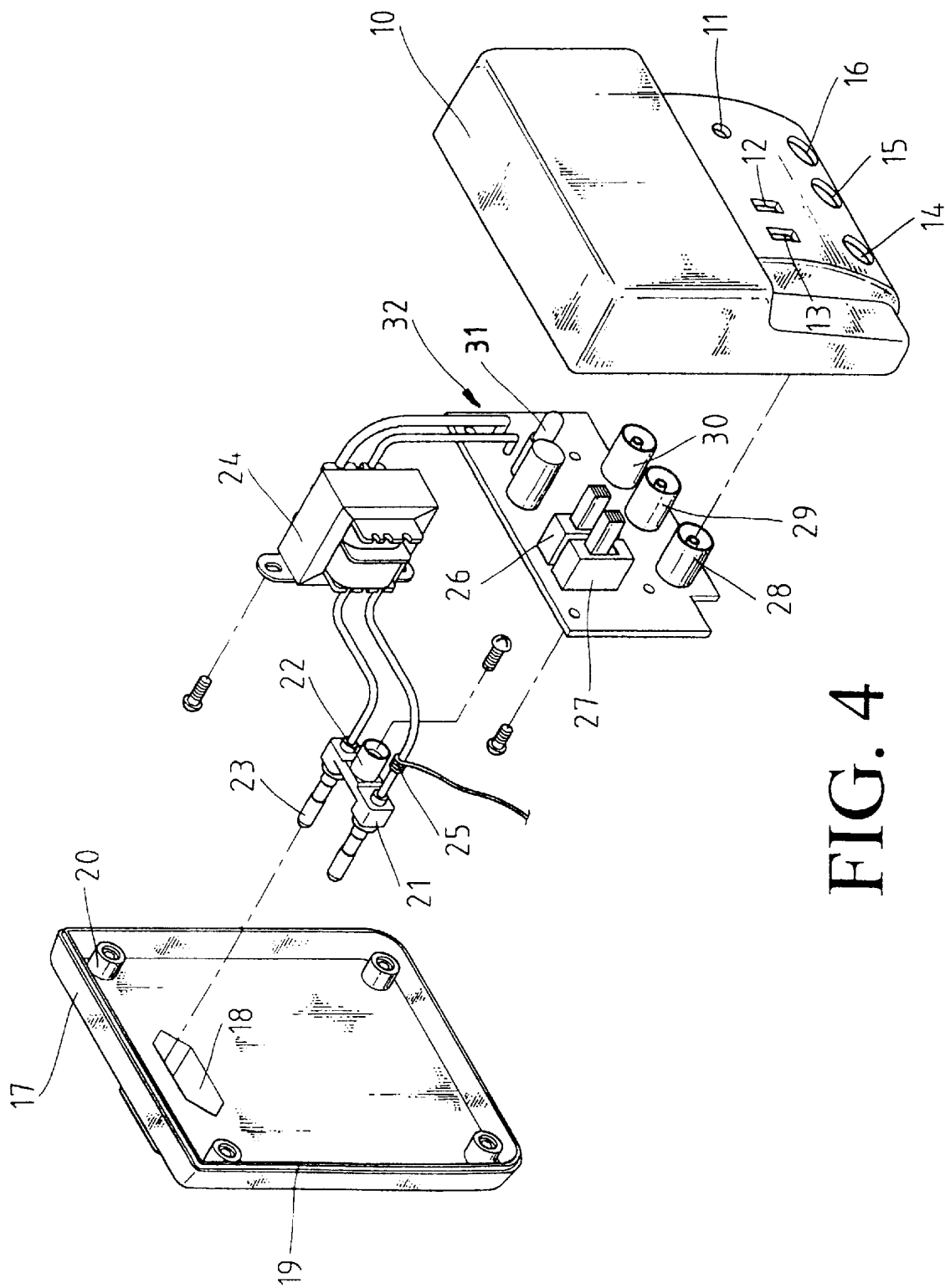
FIG. 4 is an exploded view of the embodiment in the present invention.

Referring to FIGS. 3 and 4, the signal amplifying circuit of the present invention is formed by fixedly locking to a signal amplifying circuit board 32, a transformer 24 and prongs 23 on the shell 10, which is then engaged by a cover 17.

The shell 10 is formed by injection of plastic, and is substantially a rectangular frame. Two through holes 13 and 12 for a selective switch and a through hole for an LED are installed on the middle portion of the frame, while the lower edge thereof is further installed with a P3 input through hole and P1 and P2 input through holes 15 and 16. A plurality of screw pillars are projected from the proper position within the shell 10, and a concave engaging portion is formed within the shell 10 (not shown in figure).

The cover 17 is installed to match the shell 10, and the periphery of the shell 17 is formed with a convex flange 19. The four corners of the cover 17 are installed with studs 20, while a projected prong hole 18 is installed outwards near the upper edge on the center of the cover 17.

Figure 5:
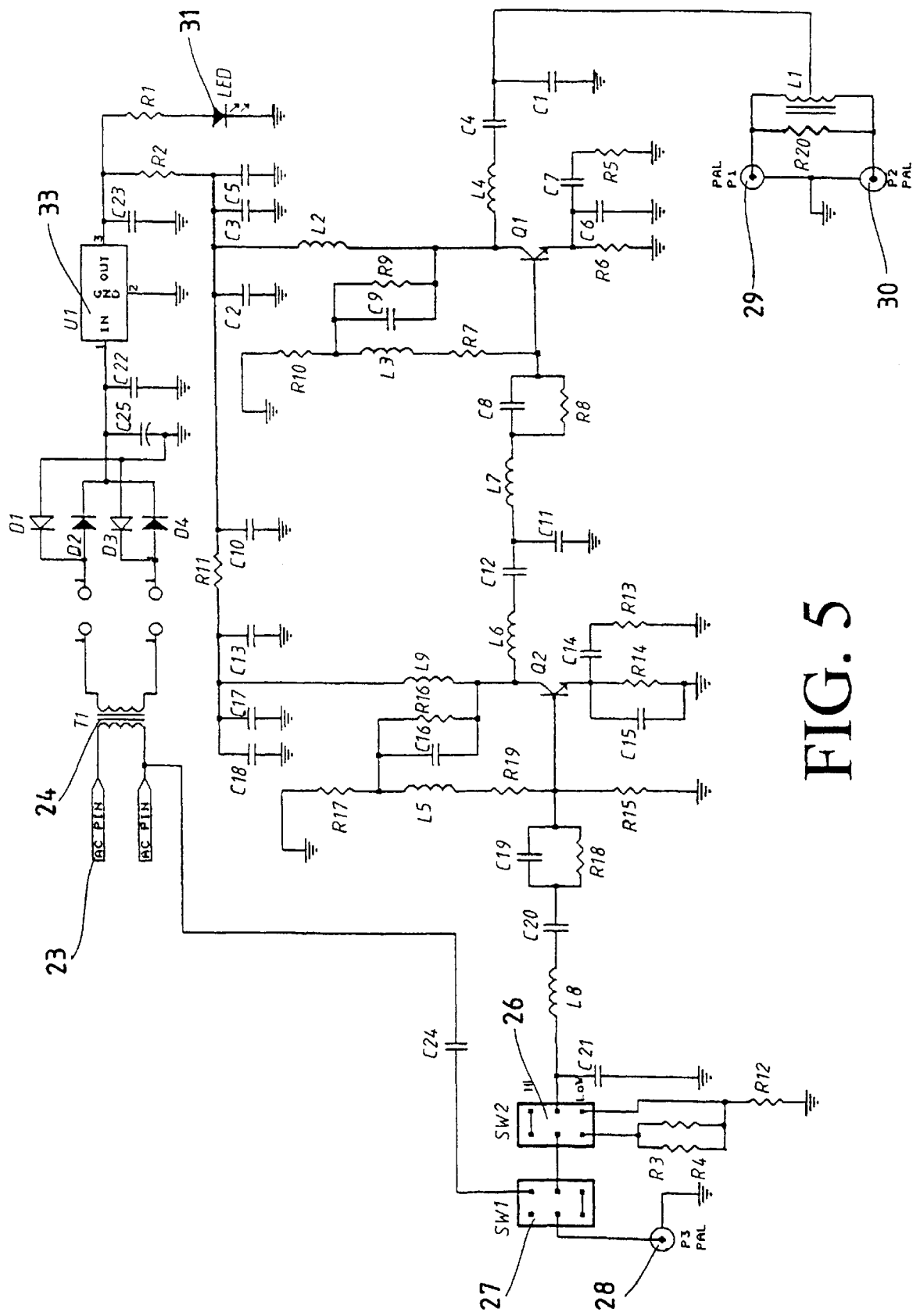
FIG. 5 is a circuit diagram of the embodiment in the present invention.

In the amplifying circuit 32, a PC board has four diodes D1, D2, D3, and D4, an U1 voltage stabilizer IC33, a red light emitting diode LED 31, two transistors Q1 and Q2, twenty five capacitors C1, C2, C3, C4, C5, C6, C7, C8, C9, C10, C11, C12, C13, C14, C15, C16, C17, C18, C19, C20, C21, C22, C23, C24, C25, twenty resistors R1, R2, R3, R4, R5, R6, R7, R8, R9, R10, R11, R12, R13, R14, R15, R16, R17, R18, R19, R20, nine inductors L1, L2, L3, L4, L5, L6, L7, L8, and L9, two SW1 and SW2 selective switches 27 and 26, a P3 input terminal 28 and two P1 and P2 output terminals 29 and 30 (as shown in FIG. 5).

The PC board is further connected with a transformer 24 the input end of which is connected on the two sides of a prong seat 21, and the center of the prong seat 21 is installed with screw pillar 22. Two prongs 23 are connected on another end of the two sides of the prong seat 21, while on the input end of the transformer 24, a single wire line 25 with a proper length is wound around the power source line.

Figure 7:
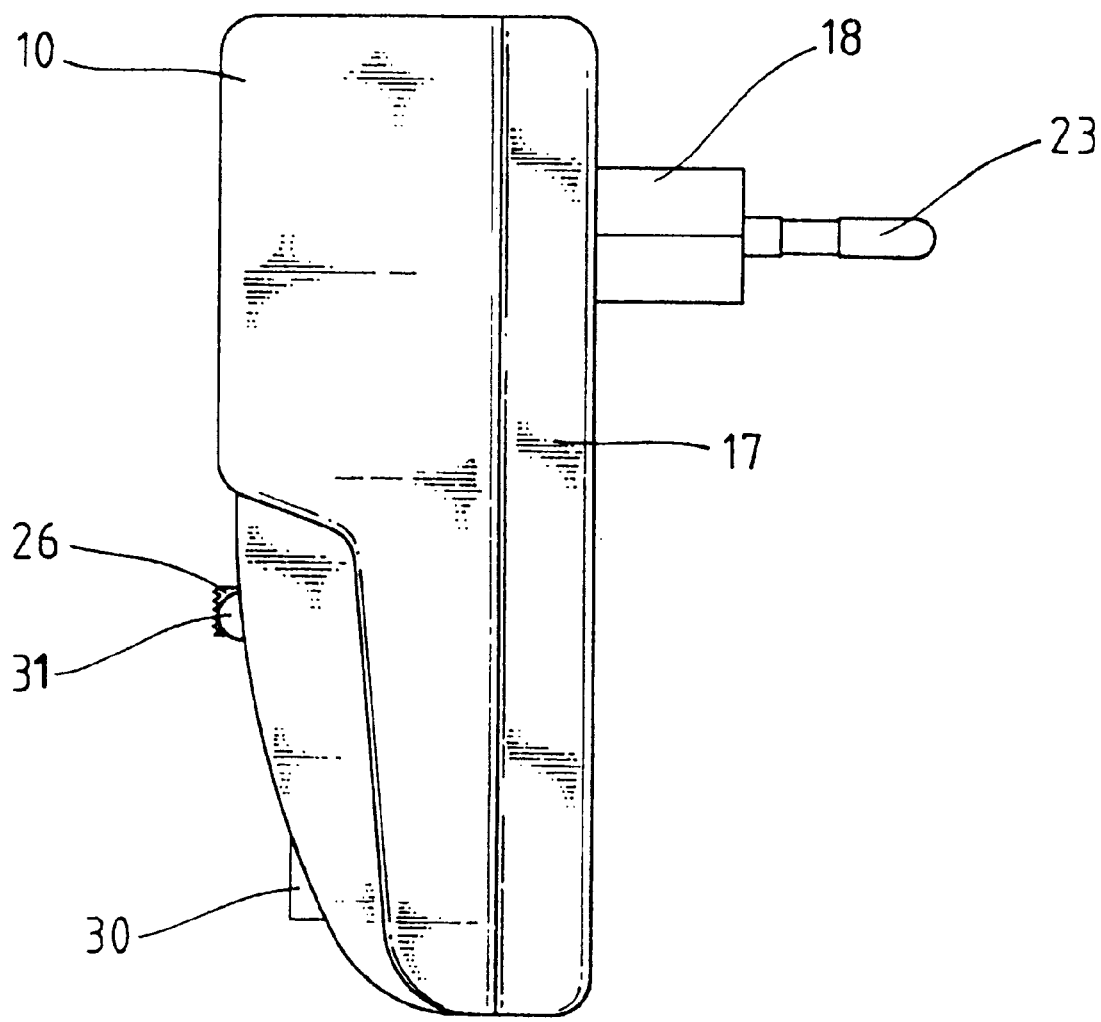
FIG. 7 is a side view of the embodiment in the present invention.
Figure 8A:
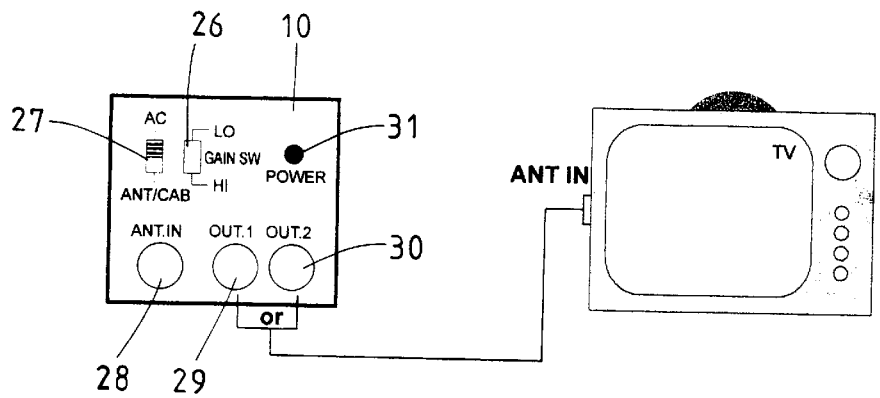
FIG. 8A is a schematic view of the embodiment showing the signal from an AC electricity outlet in the present invention.
Figure 8B:
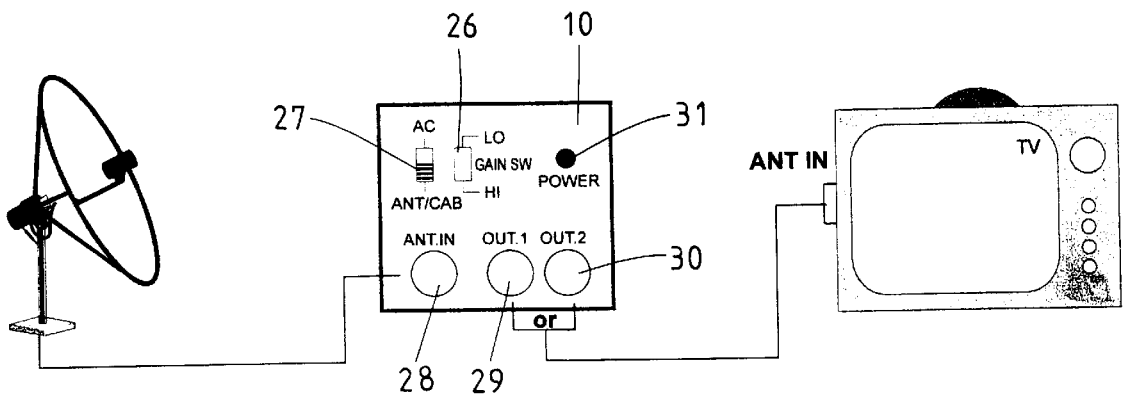
FIG. 8B is a schematic view of the embodiment showing signal from indoor antenna in the present invention.
Figure 8C:
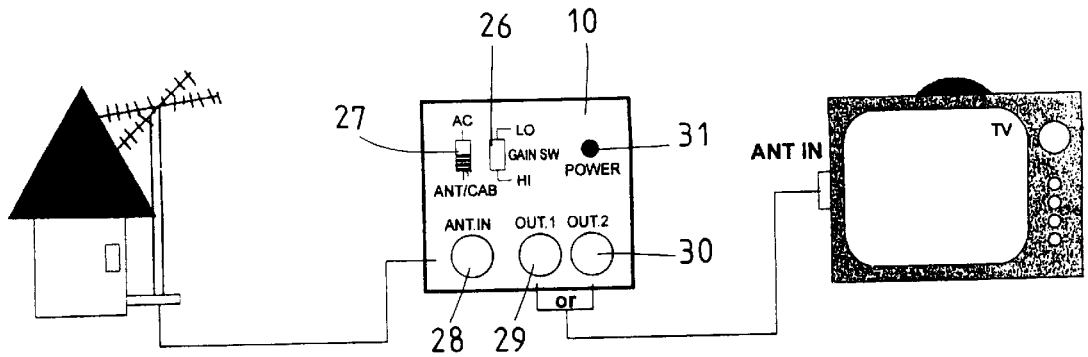
FIG. 8C is a schematic view of the embodiment showing the signal from an outdoor antenna in the present invention.
Figure 8D:
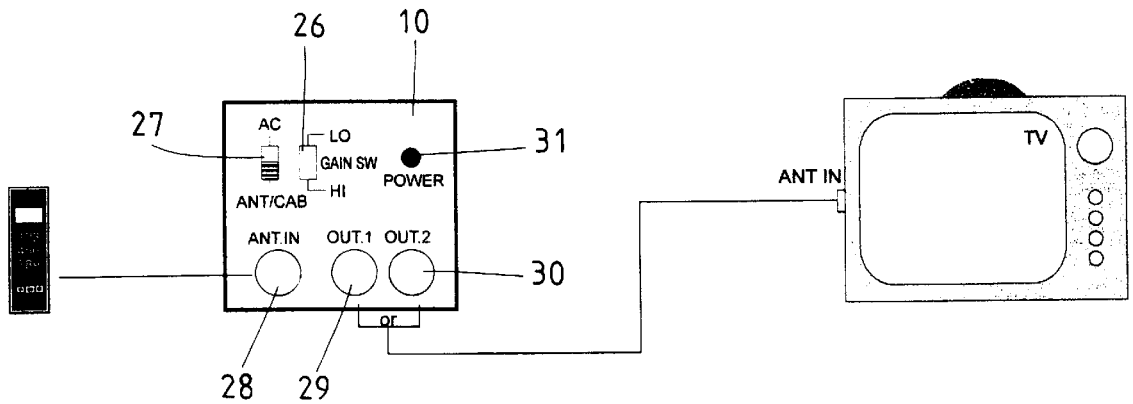
FIG. 8D is a schematic view of the embodiment showing signal from cable TV in the present invention.
Figure 8E:
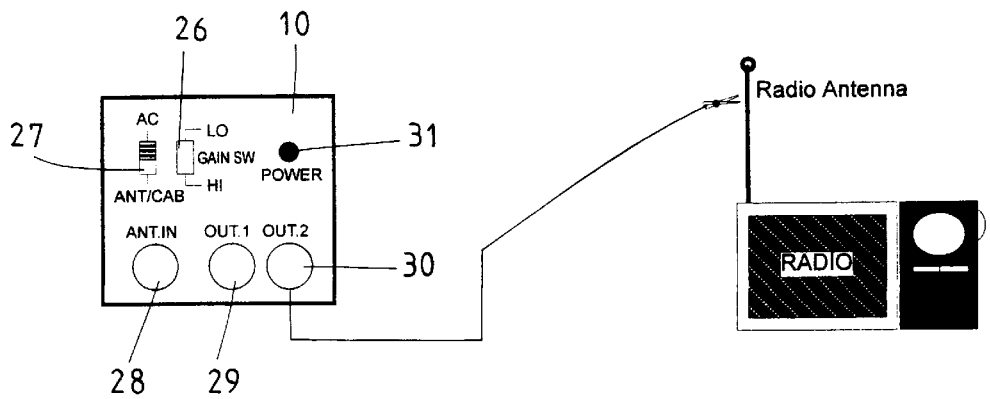
FIG. 8E is a schematic view of the embodiment showing enhance FM signal for radio in the present invention.

The PC board of the signal amplifying circuit 32 is arranged within the shell 10, so that the red light emitting diode LED 31. The two SW1 and SW2 selective switches 27 and 26, P3 input terminal 28 and the two P1 and P2 output terminals 29 and 30 are accurately arranged in the LED through hole 11 of the shell 10 and the two selective switch through holes 12 and 13, P3 input through hole 14 and P1 and P2 input through holes 15 and 16. Meanwhile, the transformer 24 is arranged above shell 10 and then integrally fixedly screwed within the shell 10. The transformer 24 is linked with the prong seat 21 and the input end of the prong 23 is arranged in the prong hole 18 to project outwards from the cover 17 so that the prong 23 is projected to the outside of the shell 17, and then the flange 19 on the periphery of the cover 17 is engaged with the concave engaging portion on the rim portion of the shell 10. Finally, the screw pillars 20 on the four corners of the cover are is fixedly screwed by screws (as shown in FIG. 7).

Figure 6:
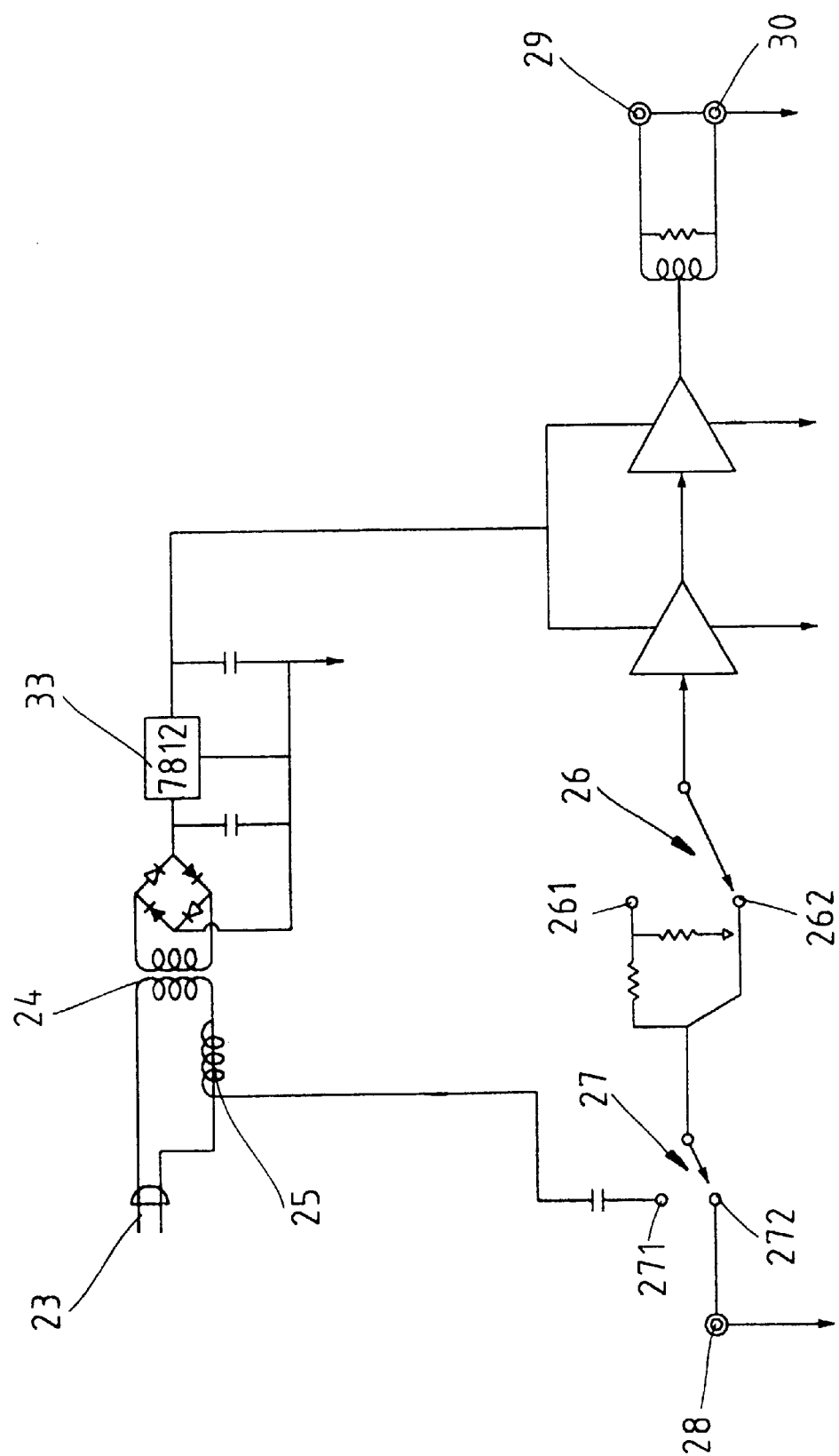
FIG. 6 is a simple flow diagram of the embodiment in the present invention.

Referring to FIGS. 5 and 6, after the power source is connected, the voltage T1 is reduced through the transformer 24 and then it is rectified and further transferred through the rectifier formed by four diodes D1, D2, D3, and D4. The rectified DC voltage is further filtered through capacitor C25 so as to generate a more stable DC output voltage. Then the DC output voltage flows through U1 stabilizer IC33 so that a fixing output voltage is obtained, and thus the LED red light emitted diode 31 is lighted up. Thereby, the SW1 selective switch 27 may be switched to the input 271 for a wireless signal received through the power line or an input 272 for the coaxial cable a of cable TV. Any type of input signal source may be selected. The SW2 selective switch 26 will form a loop through non-contact induction with the single wire line 25 so to prevent the user from getting an electric shock. The SW2 selective switch 26 is selected to switch to a lower voltage end 261 (LOW) or a high voltage end (HI), and the signals are further enhanced through the RF amplifying circuit formed by transistors Q1 and Q2, and finally, the signal is divided into two ways by the differential circuit formed by inductor L1 and resistor R20 for outputting through P1 and P2 output terminals 29 and 30. Not only are the risks of lightning strikes prevented, but also the signals of the TV will become more clear, and the amplifier may be connected with a radio device.

In the present invention, the signals of UHF/VHF/FM/CATV that are input through indoor antenna 42 or outdoor antenna 41, a cable TV system or a FM antenna (as shown in FIGS. 8A–8E, may be amplified by one hundred times. If the input from the antenna or of a cable TV becomes weak since it is transferred through the propagation of long or a plurality of receiving devices, and if it is required to have a clear frame quality or FM audio effect, the amplifying function is needed. Use of the present invention is easy, including the follow steps:

The present invention is inserted into an AC receptacle.

The SW1 selective switch 27 is used to select a selective switch source. If the SW1 is switched to the coaxial cable 272 (ANT/CAB) input of a cable TV, it is necessary to insert the indoor antenna or outdoor antenna (ANT) into the P3 input terminal 28 (ANT IN). Alternatively, SW1 may be switched to the wireless signal input 271 (AC) of the wireless linear signal so that the present invention may beneficially receive the signal transferred from the power source system.

If snow is still present on a TV, then the SW2 selective switch 26 (GAIN SETTING) is switched to a high voltage 262 (HI) or a low voltage (LOW).

If SW1 selective switch 27 is set to the input end 271 (AC) for the wireless linear signal, while the SW2 selective switch 26 is switched to the high voltage 262 (HI), and snow is still seen on the TV, then a high quality outdoor antenna 41 or indoor antenna 42 needs to be inserted into the P3 input terminal (ANT IN), and SW1 selective switch 27 should be turned to the input end 272 (ANT/CAB) of the coaxial cable of the cable TV.

In summary, the AC power source video amplifier of the present invention is formed by a simple circuit and coils so that the signal of a cable TV or outdoor antenna will be further enhanced and may be connected with a radio device. Meanwhile, a non-contact type coil may be used to reduce risks of damage due to lightning strikes or injury due to electric shock. Thus for the current signal amplifier, the whole space arrangement is a novel design and the effect has been improved.

Although certain preferred embodiment of the present invention has been shown and described in detail, it should be understood that various changes and modification may be made therein without departing from the scope of the appended claims.

What is claimed is:

1. An induced AC power source video amplifier comprising a signal amplifying circuit, a transformer, and a plastic material shell, wherein one end of the transformer is connected to a metal AC line input prong, and another end of the transformer is connected to a rectifier which supplies power to the signal amplifying circuit, the signal amplifying circuit and transformer are wholly fixedly locked on the plastic insulating shell so that the metal AC line input prong projects to the outside of the shell, the shell further has installed thereon an input terminal, an output terminal, and selective switches including an input select switch and a gain select switch, and a line section connected to a wireless input end of the input select switch is wound around an AC line connection between the AC line input prong and the transformer to form a non-contact coil arranged to pick up video signals from the AC line connection when said input select switch is switched to disconnect the antenna/cable input and instead connect the non-contact coil directly to the signal amplifying circuitry, said gain select switch enabling the antenna/cable input terminal to be selectively connected with either a television cable or an outdoor antenna.

2. The induced AC power source video amplifier as claimed in claim 1, wherein the line wound between the AC line input prong and the transformer is a single wire line.

* * * * *